United States Patent
Joern et al.

(10) Patent No.: US 8,317,958 B2
(45) Date of Patent: Nov. 27, 2012

(54) METHOD FOR PRODUCING SINGLE- OR MULTI-LAYERED FIBER PREFORMS BY THE TFP PROCESS

(75) Inventors: Paul Joern, Hamburg (DE); Ulrich Eberth, Rain (DE)

(73) Assignee: Airbus Deutschland GmbH, Hamburg (DE)

( * ) Notice: Subject to any disclaimer, the term of this patent is extended or adjusted under 35 U.S.C. 154(b) by 965 days.

(21) Appl. No.: 11/988,967

(22) PCT Filed: Jul. 24, 2006

(86) PCT No.: PCT/EP2006/064569
§ 371 (c)(1),
(2), (4) Date: May 2, 2008

(87) PCT Pub. No.: WO2007/010049
PCT Pub. Date: Jan. 25, 2007

(65) Prior Publication Data
US 2009/0050259 A1    Feb. 26, 2009

(30) Foreign Application Priority Data
Jul. 22, 2005 (DE) .......................... 10 2005 034 395

(51) Int. Cl.
*B29C 65/62* (2006.01)
*B32B 37/04* (2006.01)
*B32B 38/10* (2006.01)
(52) U.S. Cl. ........... 156/93; 156/182; 156/247; 156/289
(58) Field of Classification Search .................... 156/93, 156/182, 245, 247, 289
See application file for complete search history.

(56) References Cited

U.S. PATENT DOCUMENTS

| 4,311,661 A | 1/1982 | Palmer |
| 5,490,602 A | 2/1996 | Wilson et al. |
| 2004/0074589 A1* | 4/2004 | Gessler et al. ................. 156/155 |

(Continued)

FOREIGN PATENT DOCUMENTS

DE    196 29 044 A1    1/1997

(Continued)

OTHER PUBLICATIONS

"Erlauterungen zur TFP-Technologie", www.hightex-dresden.de/tfptech Internet Citation. Mar. 7, 2005. PDF dated Sep. 27, 2006.

(Continued)

*Primary Examiner* — Michael Tolin
(74) *Attorney, Agent, or Firm* — Greer, Burns & Crain, Ltd.

(57) ABSTRACT

A method for producing single- or multi-layered fiber preforms by the TFP process with fiber strands, aligned substantially to be oriented with the flux of force, laid on a backing layer and attached by fixing threads, to form a fiber preform with a desired material thickness and without a backing layer. A release layer is applied at least in certain regions to the backing layer and, after completion of the TFP process, the fiber preform is introduced into a fixing device, in which at least some of the fixing threads are melted. Subsequently the backing layer, separated from the fiber preform by the release layer, is detached from the fiber preform. The fiber preforms have a virtually optimum fiber structure without flaws along with a desired material thickness and are predestined for the production of composite components for load-bearing components that must withstand high mechanical loads.

9 Claims, 1 Drawing Sheet

U.S. PATENT DOCUMENTS

Figure 1:
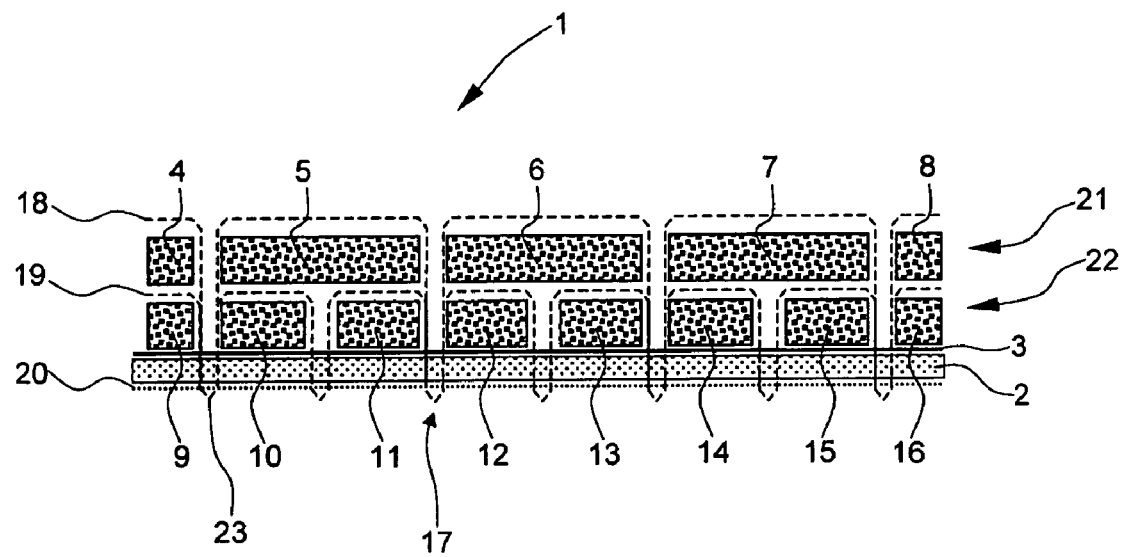

2004/0261929 A1* 12/2004 Tippett .................... 156/60
2005/0086916 A1* 4/2005 Caron .................... 55/382

FOREIGN PATENT DOCUMENTS

| DE | 196 29 044 C2 | 1/1997 |
| DE | 199 09 191 A1 | 9/2000 |
| GB | 2310822 | 9/1997 |
| WO | WO 02/45932 | 6/2002 |

OTHER PUBLICATIONS

Thomaplast®-Handbuch II, Reichtlt Chemietechnik, 2007.

* cited by examiner

METHOD FOR PRODUCING SINGLE- OR MULTI-LAYERED FIBER PREFORMS BY THE TFP PROCESS

The invention relates to a method for producing single- or multi-layered fiber preforms by the TFP process ("Tailored Fiber Placement") with fiber strands which are aligned substantially such that they are oriented with the flux of force, are laid on a backing layer and are attached by fixing threads, in particular by at least one upper fixing thread and at least one lower fixing thread, in order to form a fiber preform with virtually any desired material thickness.

The invention also relates to a backing layer for carrying out the method.

In lightweight construction, in particular in aircraft construction, use is increasingly being made of composite components made of fiber-reinforced plastics, which can withstand extreme mechanical loads and at the same time offer a high weight-saving potential. These components are formed with reinforcing fibers which are subsequently saturated or impregnated with a curable polymer material, for example a polyester resin, an epoxy resin or the like, to form the finished component. By contrast with the metallic materials that have substantially been used until now for load-bearing structural elements, fiber-reinforced composite materials have very directionally dependent mechanical properties.

The alignment of the reinforcing fibers in a component of this type therefore has a decisive influence on its rigidity and strength. To achieve optimum mechanical properties, the reinforcing fibers should, if possible, follow the direction of loading and not have any wave formation, that is to say run in an outstretched manner. In addition, it is desirable for the individual reinforcing fibers to be subjected to uniform mechanical loading.

With conventional semifinished products, such as, for example, woven or laid fiber fabrics, for reinforcement of the polymer material, not all conceivable fiber orientations can be realized, since the reinforcing fibers are generally arranged there in a specific, fixed orientation. Although laid fiber fabrics can be "draped", that is to say laid in a planar manner without creasing, for example to form segments of a circular ring or the like, the reinforcing fibers contained in them generally cannot be brought into line with the path followed by more complex lines of force flux.

One possible way of complying with the requirement for fiber alignment in accordance with loading is the known TFP process. This involves the laying of fiber strands for mechanical reinforcement ("rovings"), which are in turn formed by a multiplicity of discrete reinforcing fibers running parallel to one another, along any desired path curve and attaching them with the aid of fixing threads on a backing layer to form a fiber preform ("preform"), whereby the alignment of the individual fiber strands can be adapted virtually optimally to the flux of force acting on the finished composite component. The fixing is performed here by an upper fixing thread and a lower fixing thread, which are interlinked with one another underneath the backing layer to form loops—in a way corresponding to conventional sewing methods. The attachment of the fiber strands is performed here, for example, with customary zigzag stitches. The optimum utilization of the mechanical load-bearing capacity of the fiber strands that is achieved in this way can minimize their number, and consequently also considerably reduce the weight of the fiber preform. Moreover, the cross section of the component can be adapted in an ideal way to the respective local loads. Furthermore, reinforcements can be formed specifically in zones that are subjected to particular loading, such as, for example, regions where force is introduced or the like, by laying additional fiber strands. Glass fibers, carbon fibers, aramid fibers or the like are used, for example, as reinforcing fibers.

The production of fiber preforms by the TFP process is performed on customary CNC-controlled automatic sewing and embroidering machines, which are also used, for example, in the textile industry. Once all the required layers have been laid with fiber strands and attached on the backing layer, the finished fiber preform, which generally already has the desired final contour or final form, is placed in a closable mould, and impregnated with a curable polymer material and subsequently cured to form the finished composite component. A number of TFP fiber preforms and/or layers of reinforcing fabrics may be combined here. Multi-layered fiber preforms are formed by placing a number of (single, single-layered) fiber preforms one on top of the other, so as to be able to create greater material thicknesses that could not otherwise be produced on account of the limited needle length in the automatic sewing or embroidering machines that are used for the TFP process. Multi-layered fiber preforms accordingly have at least two backing layers, running approximately parallel to one another within the multi-layered fiber preform.

The impregnation of the fiber preforms with the curable polymer material may be performed, for example, by the known RTM process ("Resin Transfer Moulding") in a correspondingly designed closable mould.

However, with the fixing threads and the backing layers, the TFP process introduces into the fiber preform auxiliary components that no longer have to perform any function in the later composite component, in particular no backing function. Both the backing layers and the fixing threads cause problems in realizing an ideal sequence of layers and, moreover, represent a not insignificant proportion of the overall weight, in particular if a number of fiber preforms are placed one on top of the other or single-layered fiber preforms of great material thickness are formed by a multiplicity of layers of fiber strands lying one on top of the other. Furthermore, delaminations preferentially occur in the region of the backing layers in the finished composite component. Although the backing layer itself may also be formed by a woven reinforcing fabric, for example by a woven glass- or carbon-fiber fabric, even in this case at least some of the reinforcing fibers usually have an alignment that is not in accordance with the loading. Moreover, under some circumstances the woven reinforcing fabric is also damaged by the penetration with the sewing needle during the TFP process, so that the characteristic material values may be impaired. The fixing threads produce further flaws in the fiber preform, for example by the formation of a wave along the fiber strands as a result of the sewing and due to the loop formation as a result of the knotting between the upper fixing threads and the lower fixing threads. It also forms a flawed layer if a number of fiber preforms are to be laid one on top of the other.

In addition, by the TFP process, the fixing threads, the fiber strands and the backing layer are firmly joined to one another by sewing, so that it is generally not possible for the backing layer to tear away from the fiber preform, in particular without damaging the individual reinforcing fibers in the fiber strands.

DE 100 61 028 A1 does disclose a method in which the fixing threads in the fiber preform are chemically dissolved or thermally melted, but here too there is the risk of the fiber strands being damaged as a result of tearing away of the sewing base. The chemical dissolution of the fixing threads can in this case only be performed with a suitable resin system during the impregnation of the fiber preform, so that impairment of the resin matrix is not ruled out.

The object of the invention is therefore to provide a method for producing a fiber preform in accordance with the TFP process in which easy detachability of the backing layer from the fiber preform is ensured, in particular without damage to the fiber strands, in order to form a fiber preform, in particular without troublesome backing layers, that gives a composite component produced with it virtually optimum laminating properties but is also accompanied by an alignment of the reinforcing fibers that is substantially oriented with the flux of force. In addition, the influence on the mechanical properties of the fiber preform caused by the fixing threads required in the TFP process, in particular by the formation of flaws and the like, is to be reduced.

The object according to the invention is achieved by a method with the features of the characterizing clause of Patent claim 1.

The fact that a release layer is first applied to the backing layer, at least in certain regions, and that, after completion of the TFP process, the fiber preform is introduced into a fixing device, in which at least some of the fixing threads are melted by heat being supplied, and subsequently the backing layer, separated from the fiber preform by the release layer, is detached from the fiber preform means that the backing layer required for carrying out the TFP process can be detached from the fiber preform without damaging the fiber strands of the latter. At the same time, the melting fixing threads make it possible to secure the spatial position of the fiber strands within the fixing device, so that the fiber preform can be removed from the fixing device without undergoing any significant dimensional change for further processing steps after the at least partial melting of the fixing threads for detaching the backing layer that has been separated from the fiber preform by the release layer.

A further advantageous refinement of the method according to the invention provides that the release layer is formed by material having nonstick properties. As a result of this release layer, the backing layer can be detached from the fiber preform substantially without any damage to the fiber strands in the said fiber preform.

In accordance with a further advantageous refinement of the method according to the invention, it is provided that the spatial position of the fiber strands is secured in the fixing device before the at least partial melting of the fixing threads by applying a negative pressure.

This avoids displacements of fiber strands within the fiber preform before or during the melting process in the fixing device. The fixing device may be formed here as a base, the form of which corresponds substantially to the fiber preform to be produced. The fiber preform that is formed by the TFP process is introduced into a vacuum enclosure, subsequently placed on the base and connected to it in an airtight manner by sealing elements. By applying a negative pressure to the vacuum enclosure, the latter presses itself against the fiber preform and thereby fixes the fiber strands. If appropriate, in particular in the case of fiber preforms of a large format, it may be necessary to cover the fiber preform at least in certain regions with an air-permeable drainage layer, for example an air-permeable nonwoven or the like, in order to allow the negative pressure to act as uniformly as possible over the entire surface of the fiber preform. Alternatively, rigid foam sheets with an open-pore cell structure may also be used. To avoid the fiber preform sticking to the inner side of the vacuum enclosure and/or the base, release films may be placed onto the fiber preform, at least in certain regions.

In accordance with a further advantageous refinement, at least the upper fixing threads and/or the lower fixing threads are at least partially melted to secure the spatial position of the fiber strands in the fixing device. As a result, a good bond is achieved between the fiber strands, largely avoiding unwanted displacement of the spatial position of the fiber strands. This allows the fiber preform to be removed from the fixing device after completion of the fixing operation in the said fixing device for subsequent processing steps, for example the detachment of the backing layer or the like, without the risk of deformations. In addition, flaws in the fiber preform are largely evened out or eliminated, so that the fiber preform has virtually optimum mechanical properties. Such flaws occur, for example, in the form of the formation of a wave on the fiber strands due to the sewing of the fiber strands with the fixing threads. Furthermore, in particular in the case of fiber preforms with many layers of fiber strands, the sewing of the fiber strands by the upper fixing threads and the lower fixing threads may lead to increased loop formations underneath the backing layer and, under some circumstances, to instances of knotting within the fiber preform. Such flaws are eliminated by the melting of at least some of the fixing threads. Furthermore, the melting of at least the upper fixing thread together with the release layer make it possible for the backing layer to be detached very easily from the fiber preform without the fiber strands being damaged. When this happens, the material of the fixing threads has an adequately high viscosity in the melted state, so that uncontrolled introduction of material into the fiber preform does not take place.

In accordance with a further advantageous refinement, the spatial position of the fiber strands in the fixing device is secured by an additional binding agent, in particular a thermoplastic material and/or a thermosetting material.

This allows a further improvement in the way in which the fiber strands are held together, and consequently the dimensional stability of the fiber preform.

The object according to the invention is also achieved by a backing layer formed according to one of Patent claims 8 to 11.

The fact that the backing layer has at least in certain regions at least one release layer, allows the backing layer to be detached or lifted off from the fiber preform easily, and in particular without damaging the fiber strands within the said fiber preform.

In addition, the object according to the invention is achieved by a fiber preform according to claim 12.

The fact that the fiber preform is formed by the method according to one of claims 1 to 7, means that it has virtually optimum mechanical properties, since in particular there is no longer any backing layer, impairing the homogeneity of the fiber preform, and flaws in the fiber preform are largely eliminated by the at least partial melting of the fixing threads, which is of significance in particular in the case of multilayered fiber preforms.

Further advantageous refinements of the method and of the backing layer are presented in further patent claims.

Figure 2:
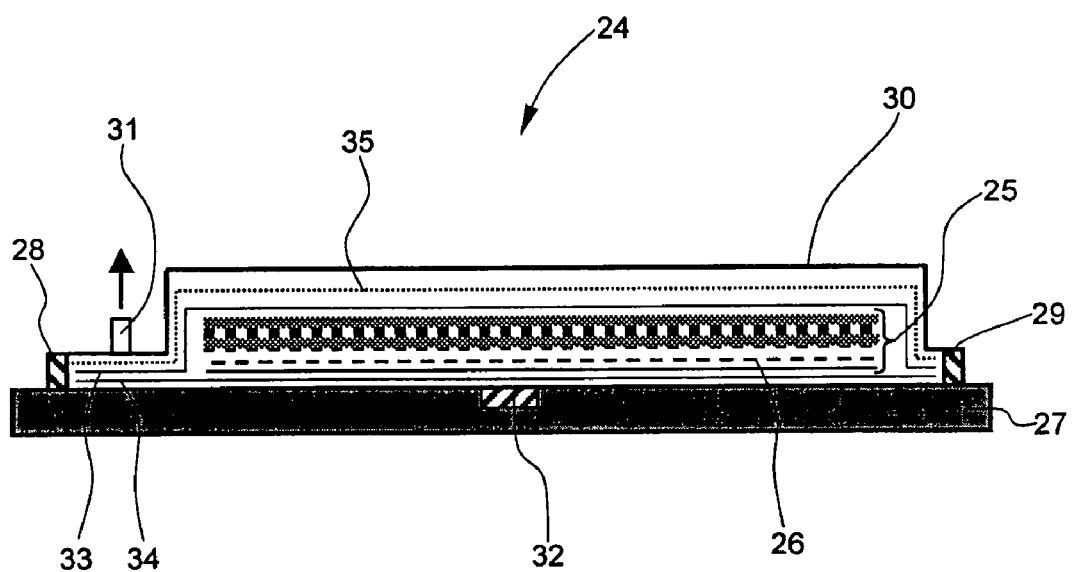

In the drawing:

FIG. 1 shows a schematic cross-sectional representation through a fiber preform formed by the TFP process, with a release layer, and FIG. 2 shows a fixing device for carrying out the method according to the invention.

The method according to the invention and the backing layer according to the invention are to be described in more detail below on the basis of FIGS. 1, 2.

FIG. 1 shows a schematic cross-sectional representation through a fiber preform formed by the TFP process, with a release layer.

A fiber preform 1 has, inter alia, a backing layer 2 and a release layer 3 arranged on the latter. The release layer 3 is formed, for example, by a thin-layered PTFE film or the like, which has good nonstick properties.

Furthermore, the release layer 3 may also be formed by films of other polymers that have good nonstick properties, such as for example polyethylene, polypropylene or the like. In addition, the release layer may be formed by a sheet-like formation, for example a woven fabric, that is provided with a release agent, for example a release coating or the like. The release layer 3 may alternatively be produced by spraying or coating a nonstick material onto the backing layer 2, so that the release layer 3 is in this case an integral part of the backing layer 2. The release layer 3 may also be applied to the backing layer 2 by the manufacturer.

In a known way, fiber strands 4 to 16 are laid on the release layer 3 by the TFP process with an alignment that is substantially oriented with the flux of force and are attached to the backing layer 2 by the fixing threads 17 in the form of the upper fixing threads 18, 19 and the lower fixing thread 20. The fiber strands 4 to 16 are formed by a multiplicity of individual reinforcing fibers, for example glass fibers, carbon fibers or aramid fibers, arranged parallel to one another. In the representation of FIG. 1, the reinforcing fibers run substantially perpendicularly to the plane of the drawing. The fiber strands 4 to 8 form an upper layer 21 and the fiber strands 9 to 16 form a lower layer 22 within the fiber preform 1. The needle that is usually used in the TFP process for guiding the fixing threads 17 thereby penetrates the layers 21, 22 and the release layer 3 arranged between the layer 22 and the backing layer 2, including the backing layer 2. Known automatic sewing and embroidering machines, for example CNC-controlled machines, which make it possible for the sewing head to be controlled in two spatial dimensions, may be used for the production of the fiber preform 1. The guidance of the fiber strands to be laid may be performed by the sewing head or a separate guiding means.

The upper fixing threads 18, 19 and/or lower fixing threads 20 are formed by a readily meltable material, for example a thermoplastic material, a fusible yarn or the like. In this case, the meltable material has such a high viscosity in the melted state that, as far as possible, no uncontrolled distribution takes place within the fiber preform 1. The backing layer 2 may be formed by a customary material that is suitable for the TFP process, since it is mechanically detached or lifted off from the release layer 3 to conclude the process. As a difference from the procedure in the case of known TFP processes, according to the invention there is between the second layer 22 and the backing layer 2 of the fiber preform 1 at least one release layer 3, which is connected to the fiber preform 1 or the backing layer 2 by the sewing or embroidering process.

As a result of the interlinkage between the upper fixing threads 18, 19 and the lower fixing threads 20, a multiplicity of loops 23 form underneath the backing layer 2, only one of which is provided with a reference numeral for the sake of overall clarity of the drawing. By means of the loops, the fiber strands 4 to 16 underneath the backing layer 2 are joined to the latter or firmly attached to it. To form so-called multi-layered fiber preforms, a number of fiber preforms 1 from which the backing layers 2 have been removed and the fixing threads 17 at least partially melted are arranged one on top of the other.

FIG. 2 shows an exemplary embodiment of a fixing device, which can be used for melting at least some of the fixing threads in the course of carrying out the method according to the invention.

A fiber preform 25 with a release layer 26, which has been produced by the known TFP process, has already been placed in the fixing device 24. The fiber preform 25 has a construction that corresponds to the representation of the fiber preform 1 in FIG. 1.

The fixing device 24 comprises, inter alia, a base 27, sealing elements 28, 29 and a vacuum enclosure 30 with a vacuum connection 31. Also provided are a heating device, not represented, and a temperature sensor 32. By means of the sealing elements 28, 29, the vacuum enclosure 30 is hermetically sealed with respect to the surroundings and connected to the base 27.

To carry out the phase of the method that concerns the at least partial melting of the fixing threads, in a first method step the fiber preform 25 formed by the TFP process is placed into the fixing device 24. To avoid unwanted adhesive attachment of the fiber preform 27 to other components of the arrangement, it is, if required, at least partially covered with release films 33, 34. The release films 33, 34 have good nonstick properties and may be formed by the same material as the release layer 26. The release films 33, 34 may be formed, for example, by a PTFE material or the like. To ensure an adequately high negative pressure everywhere within the vacuum enclosure 30, in particular in the case of fiber preforms 25 of a large surface area, an air-permeable nonwoven 35 is arranged at least in certain regions above the fiber preform 35, substantially performing the function of "vacuum or negative-pressure drainage". As a result of the air-permeable nonwoven 35, the negative pressure acts uniformly over the entire surface area of the fiber preform 35.

In a second method step, a negative pressure is applied to the vacuum connection 31. This negative pressure has the effect that the fiber preform 25 is firmly pressed together as a result of the ambient air pressure prevailing, and at the same time pressed onto the base 27, so that undesired displacements of the fiber strands are largely prevented, until the fixing threads are at least partially melted and the cooled fixing thread material takes its binding effect within the fiber preform 25.

In a third method step, the fixing device 24 is heated up by the heating device, so that the fixing threads in the fiber preform 25 at least partially melt and fix the latter, that is to say in particular secure the spatial position of the fiber strands in relation to one another. After the cooling of the fiber preform 25, it can be taken out from the fixing device 24 without the risk of uncontrolled dimensional changes, since there is adequate dimensional stability as a result of the binding effect of the fixing thread material that has penetrated into the fiber preform 35 and cooled down. The fixing effect as a result of the melting of the fixing threads may be further increased by adding a binder in or on the fiber preform 25. Thermoplastic and/or thermosetting materials, in particular in the form of a powder or granules, come into consideration as binders, for example.

In a fourth method step, finally, the backing layer is removed. The removal of the backing layer is possible without any problem as a result of the nonstick effect of the release layer 26. In particular, the presence of the release layer 26 makes it possible for the backing layer to be detached from the fiber preform 25 easily and without leaving any remains, and without damaging the fiber strands, for example by split ends or breakage of the reinforcing fibers. The base 27 preferably has a surface geometry that corresponds approximately to the intended form of the composite component subsequently to be produced from the fiber preform 25. The base 27 may be flexibly formed for adaptation to fiber preforms with different forms.

The sequence of the entire method is monitored by an open-loop and closed-loop control device, which is not represented but, for example, also detects the temperature values determined by the temperature sensor 32 and controls the supply of heat introduced into the fiber preform by the heating device in a way corresponding to the stipulated requirements. It is also possible by the open-loop and closed-loop control device for the surface geometry of the base 27 to be adapted under computer-control to fiber preforms with different forms. The open-loop and closed-loop control device monitors and controls the sequence of the individual method steps and consequently ensures a preferably fully automatic sequence of the method according to the invention.

After a possibly still required step of cutting it to size, the fiber preform 25 formed in this way can subsequently be cured directly with a curable polymer material in a closed mould, for example by the known RTM process ("Resin Transfer Moulding") to form a finished composite component. A polyester resin, an epoxy resin, a BMI resin or the like comes into consideration, for example, as the curable polymer material. Before the final completion of the composite component, a number of fiber preforms may be arranged in the RTM mould to form multi-layered fiber preforms. The final production of the composite component, that is to say the impregnation of the fiber preform 25 with a resin system that can be cured by crosslinking and its curing, is not performed in the fixing device 24, but in a separate, closable RTM mould.

The fiber preforms formed in this way have virtually optimum mechanical properties, with at the same time very low weight. In particular, the melting of at least some of the fixing threads and the subsequent detachment of the backing layer have the effect of largely eliminating inhomogeneities or flaws within the fiber preform, so as to obtain a "quasi isotropic" fiber preform with a virtually ideal alignment of the reinforcing fibers such that they are oriented with the flux of force, giving the composite components produced with it a virtually optimum laminate structure. Composite components produced by the method according to the invention can thereby have large material thicknesses, by a number of fiber preforms being arranged one on top of the other. Moreover, the occurrence of delaminations, which in the case of the known fiber preforms may occur in the region of the backing layers, is avoided.

Accordingly, the fiber preforms produced by means of the method according to the invention are predestined for the production of composite components for load-bearing components that have to withstand high mechanical loads in the aerospace sector.

The invention accordingly relates to a method for producing single- or multi-layered fiber preforms (1, 25) by the TFP process with fiber strands 4-16 which are aligned substantially such that they are oriented with the flux of force, are laid on a backing layer 2 and are attached by fixing threads 17, in particular by at least one upper fixing thread 18, 19 and at least one lower fixing thread 20, in order to form a fiber preform 1, 25 with virtually any desired material thickness, wherein a release layer 3, 26 is first applied at least in certain regions to the backing layer 2 and, after completion of the TFP process, the fiber preform 1, 25 is introduced into a fixing device 24, in which at least some of the fixing threads 17 are melted by heat being supplied, and subsequently the backing layer 2, separated from the fiber preform 1, 25 by the release layer 3, 26, is detached from the fiber preform 1, 25.

The release layer 3, 26 is preferably formed by a material having nonstick properties.

By way of example, the spatial position of the fiber strands 4-16 is secured in the fixing device 24 before the at least partial melting of the fixing threads 17 by applying a negative pressure.

At least the upper fixing threads 18, 19 and/or the lower fixing threads 20 are advantageously at least partially melted to secure the spatial position of the fiber strands 4-16 in the fixing device 24.

The spatial position of the fiber strands 4 to 16 is, for example, secured in the fixing device 24 by an additional binding agent, in particular a thermoplastic material and/or a thermosetting material.

The fixing threads 17 are advantageously formed by a readily meltable material, in particular a thermoplastic material, a fusible yarn or the like.

At least two fiber preforms 1, 25 are advantageously arranged one on top of the other to form a multi-layered fiber preform.

The invention also relates to a backing layer 2 for the production of a fiber preform 1, 25 in accordance with the claimed method, the backing layer 2 having at least in certain regions at least one release layer 3, 26.

The release layer 3, 26 is formed in particular by a material that has nonstick properties.

The release layer 3, 26 is preferably formed by a polymer film, in particular by a PTFE film with a small layer thickness.

The release layer 3, 26 is, for example, formed by a coating applied at least in certain regions to the backing layer 2.

The fiber preform 1, 25 is preferably formed by the claimed method.

List of Reference Numerals
1 fiber preform
2 backing layer
3 release layer
4 fiber strand
5 fiber strand
6 fiber strand
7 fiber strand
8 fiber strand
9 fiber strand
10 fiber strand
11 fiber strand
12 fiber strand
13 fiber strand
14 fiber strand
15 fiber strand
16 fiber strand
17 fixing threads
18 upper fixing thread
19 upper fixing thread
20 lower fixing thread
21 layer
22 layer
23 loop
24 fixing device
25 fiber preform
26 release layer
27 base
28 sealing element
29 sealing element
30 vacuum enclosure
31 vacuum connection
32 temperature sensor
33 release film
34 release film
35 nonwoven

What is claimed is:

1. A method for producing single- or multi-layered fiber performs by the TFP process, comprising:
   a) applying a release layer in the form of a PTFE film with a small layer thickness to a backing layer,
   b) laying fiber strands which are aligned substantially such that they are oriented with the flux of force onto the release layer,
   c) attaching the fiber strands by fixing threads to the backing layer to form a fiber preform with a desired material thickness, wherein the fixing threads form loops extending through the release layer and the backing layer,
   d) after completion of the TFP process, introducing the fiber preform into a fixing device,
   e) partially melting the fixing threads in the fixing device by heat being supplied,
   f) cooling the partially melted fixing threads to bind within the fiber preform, and
   g) detaching the backing layer, separated from the fiber preform by the release layer, from the fiber preform.

2. The method according to claim 1, wherein the spatial position of the fiber strands is secured in the fixing device before the partial melting of the fixing threads by applying a negative pressure.

3. The method according to claim 1, wherein the fiber strands are attached by at least one upper fixing thread and at least one lower fixing thread.

4. The method according to claim 3, wherein at least one of the upper fixing threads and the lower fixing threads is partially melted to secure the spatial position of the fiber strands in the fixing device.

5. The method according to claim 4, wherein the additional binding agent is at least one of a thermoplastic material and a thermosetting material.

6. The method according to claim 1, wherein the spatial position of the fiber strands in the fixing device is secured by an additional binding agent.

7. The method according to claim 1, wherein the fixing threads are formed by a readily meltable material.

8. The method according to claim 1, wherein the readily meltable material is at least one of a thermoplastic material and a fusible yarn.

9. The method according to claim 1, wherein at least two fiber preforms are arranged one on top of the other to form a multi-layered fiber preform.

* * * * *